United States Patent [19]

Baughman et al.

[11] Patent Number: 5,667,435
[45] Date of Patent: Sep. 16, 1997

[54] METHOD AND APPARATUS FOR SEPARATING MEAT FROM BONES

[75] Inventors: Dean E. Baughman; Thomas C. Goldston, both of Lehi, Utah

[73] Assignee: Beehive, Inc., Sandy, Utah

[21] Appl. No.: 633,044

[22] Filed: Apr. 16, 1996

[51] Int. Cl.[6] .......................... B02C 23/16; A22C 17/00
[52] U.S. Cl. .................................. 452/138; 241/74
[58] Field of Search ........................ 452/138, 135; 241/24, 74, 82.3, 89.2, 89.1, 68, 24.11

[56] References Cited

U.S. PATENT DOCUMENTS

| | | |
|---|---|---|
| 4,014,075 | 3/1977 | Van Bergen . |
| 4,025,001 | 5/1977 | Yarem et al. . |
| 4,042,176 | 8/1977 | Beck et al. ............... 452/138 |
| 4,141,113 | 2/1979 | Van Bergen . |
| 4,536,920 | 8/1985 | Amersfoort . |
| 4,638,954 | 1/1987 | Poss ........................ 241/74 |
| 4,705,055 | 11/1987 | Rohm et al. ............. 241/74 |
| 5,041,055 | 8/1991 | Roth ........................ 452/138 |
| 5,160,290 | 11/1992 | Richburg ................. 452/138 |
| 5,213,541 | 5/1993 | Richburg et al. ........ 452/138 |
| 5,306,202 | 4/1994 | Meeker ................... 452/138 |

FOREIGN PATENT DOCUMENTS 1 563 750   3/1980   United Kingdom .

Primary Examiner—Willis Little
Attorney, Agent, or Firm—Watson Cole Stevens Davis

[57] ABSTRACT

A press for separating meat from bones includes an annular pressure chamber defined by an inner slotted separation chamber surrounded by an outer slotted separation chamber for reducing pressure within the chamber by increasing the total open area in the slotted chambers through which the meat can flow, to improve upon the texture of the meat recovered, to reduce its calcium content, and to avoid the total destruction of the bone. Pressure reduction is effected by reducing the volume of the product being depressed in the annular chamber, the elongated slots of the separation chambers present shearing edges for shearing away the meat from the bone as the separation chambers are counter-rotated. A back pressure control valve automatically opens in response to annular chamber pressure acting as a flow restrictor for controlling the pressure. Knife blades for the slotted separation chambers remove connective tissues from the slots to prevent clogging and to further reduce the calcium content of the recovered coarse meat.

24 Claims, 3 Drawing Sheets

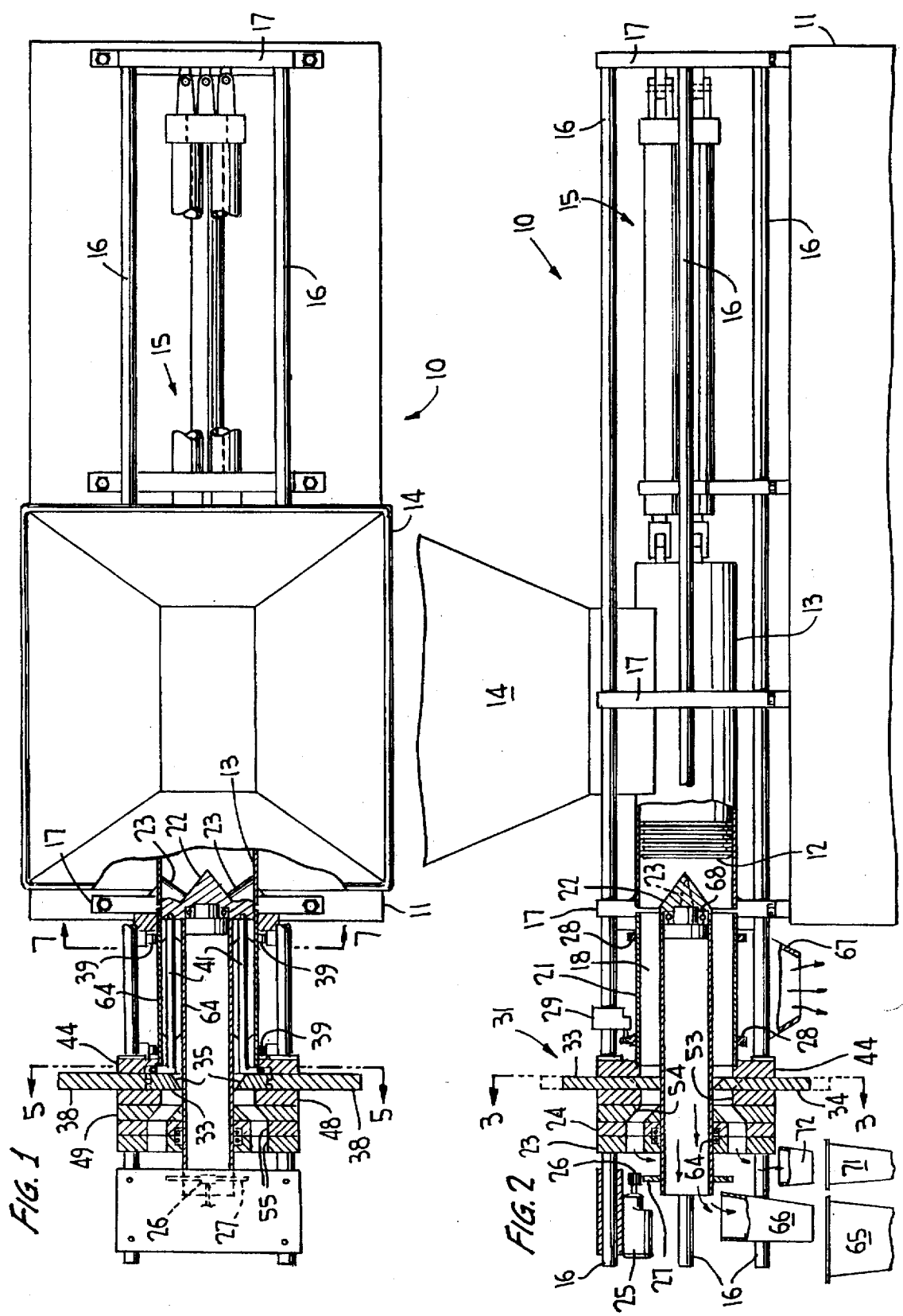

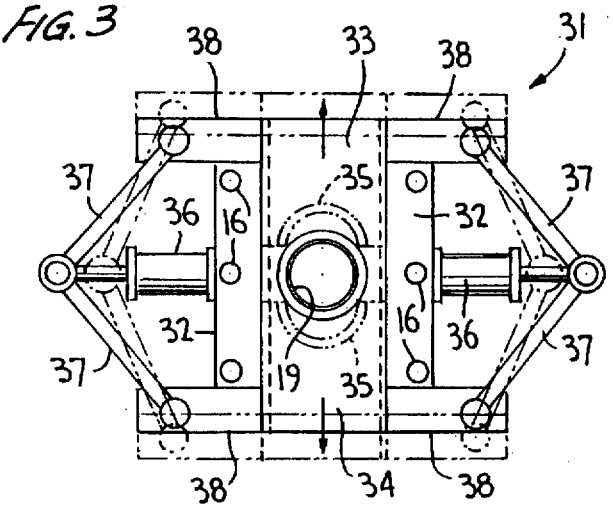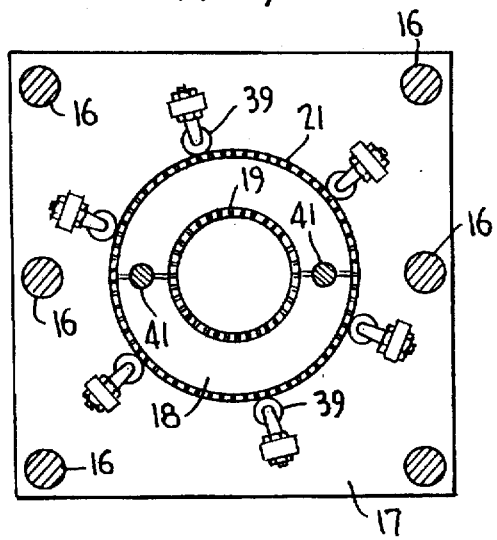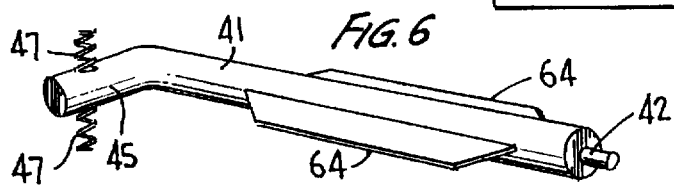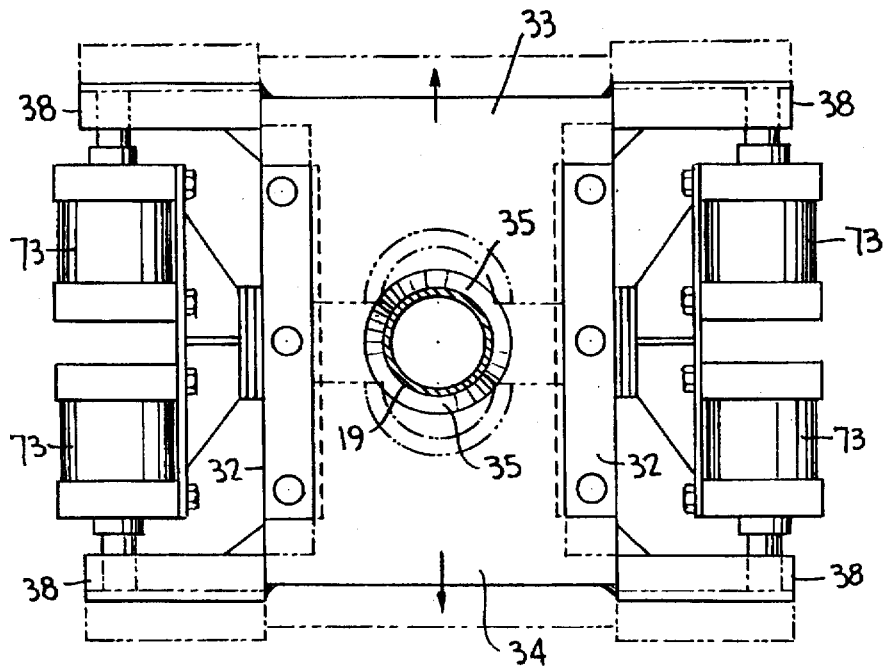

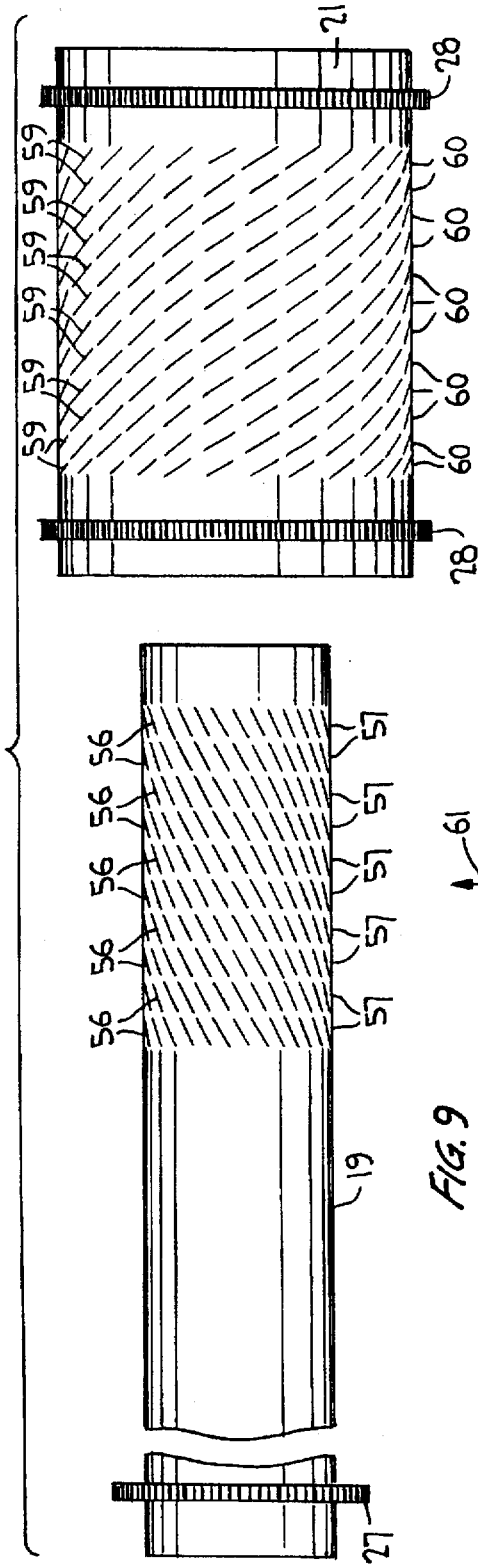
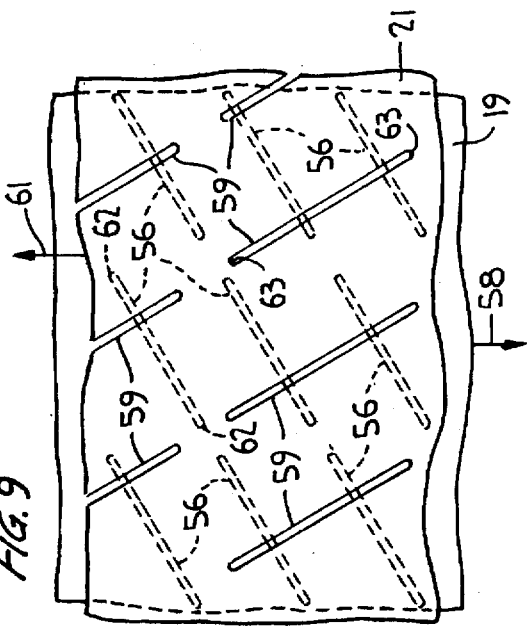
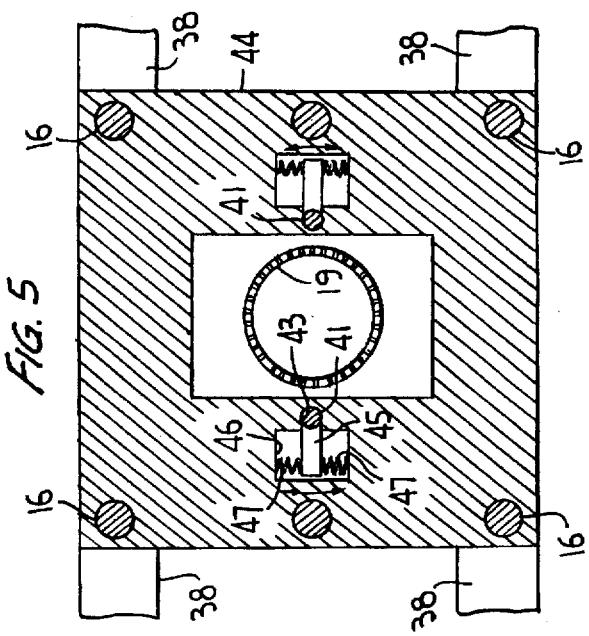

METHOD AND APPARATUS FOR SEPARATING MEAT FROM BONES

BACKGROUND OF THE INVENTION

This invention relates generally to a meat recovery method and apparatus by which meats such as beef, pork and mutton non-connective tissues are mechanically separated from essentially flat bones, such as neck, back, rib, etc., without the total destruction of the bone. Coarse texture results in the tissues removed, such as 0.06 inch thick or greater having a low calcium content.

A known press for separating meat from bones generally comprises a cylindrical pressure chamber for containing a combination of meat and bones to be separated, a pressure piston slidable within the pressure chamber to exert pressure on the contents within the pressure chamber, a sealing wall for closing off the end of the pressure chamber opposite the piston when pressure is exerted by the piston, and a perforated lining sleeve within the pressure chamber, the piston extending into the sleeve for exerting pressure on the meat and bones within the pressure chamber to separate the meat and bone combination by forcing meat through the openings in the sleeve into a collector channel.

The meat recovered is generally in the form of a pasty mass due to the extreme pressure required for the separation process limiting the end use of the recovered meat slurry. Also, the elevated pressure applied by the pressure piston tends to totally destroy the bone giving rise to unacceptable calcium levels in the recovered meat.

A press of the foregoing type is disclosed in British Patent 1,563,750 and in U.S. Pat. No. 4,536,920 in which a perforated chamber liner is employed, the pressure piston filling the liner with a combination of meat and bones for separation by pressing. The sealing wall is retractable relative to the discharge end of pressure chamber such that a cake of crushed bone material may be removed.

U.S. Pat. Nos. 4,014,075 and 4,141,173 discloses similar presses for separating meat from bones except that the sealing wall is in the form of a slide valve having an opening which is laterally shifted into and out of axial alignment with the pressure chamber for opening and closing the chamber.

The meat recovered utilizing the known presses is not readily usable as a primary meat source. Moreover, some of the crushed bone tends to pass through the lining perforations together with the separated meat such that the recovered meat has an undesirable amount of bone marrow and a calcium content which affect the quality of the meat and could fail to meet industry and government standards.

The lining perforations, which are typically round holes provided in a liner sleeve, oftentimes clog with bone and sinew such that the press operation must be interrupted until the clogged liner is replaced with a clean liner, thereby leading to downtime losses in operation and requiring an inventory of clean liners for each given press operation.

Other disadvantages presented by the known meat recovery presses concern the sealing wall at that end of the pressure chamber opposite the pressure piston which exerts pressure against the meat and bone combination. The sealing wall is formed at the end of a hydraulic ram which must be retracted to open the chamber for expelling the crushed bone cakes, or is in the form a transversely slidable valve having a through opening which when shifted into axial alignment with the pressure chamber facilitates discharge of the crushed bone cakes.

With either arrangement the forced applied by the pressure piston must be relaxed when the sealing wall is open. This slows the meat recovery operation and, when the end sealing wall is mounted on a pressure actuated ram, adds to the floor space and equipment required for this purpose.

SUMMARY OF THE INVENTION

It is therefore an object of the present invention to avoid the aforenoted disadvantages of the known meat recovery presses by the provision of a press which improves not only the texture of the recovered meat but which practically eliminates the calcium and bone marrow content to an almost negligible level. Meat recovery is carried out according to the invention without the total destruction of the bone and without liner clogging and the need for liner replacement. The recovered meat is coarse in texture promoting use as a primary meat source for finished goods production.

Pressures required to effect separation are sufficiently low to minimize cell destruction. Pressure reduction according to the invention is effected by increasing the combined open area through which the separated meat can flow, and by reducing the volume of the meat and bones combination being compressed. And the back pressure valve is improved by the use of a flow restrictor which is effected by a feedback pressure system which improves upon the overall operation of the press as the bone and sinew waste are discharged without relaxing the pressure applied by the pressure piston.

According to the invention a perforated separation chamber or screen is provided both internal to and external to the product flow to present an annular pressure chamber. A back pressure valve is provided at the discharge end of the chamber, and the meat/bones combination in the pressure chamber is depressed for separating the meat which flows outwardly of the outer chamber and inwardly of the inner chamber without pulverizing or grinding the bones.

The calcium content in the recovered meat is drastically reduced. And, the pressure in the chamber is controlled by a flow restrictor which is effected by a feedback pressure system.

The inner and outer perforated separation chambers, coaxially arranged with the outer surrounding the inner, may be rotated in opposite directions about the common axis of the chambers for subjecting the meat and bone combination to a shearing action which effects a high rate of meat recovery without pulverizing the bone.

The perforated separation chambers are formed with elongated slots which may be oriented parallel to the central axis of the separation chambers (0°), or which may lie at an angle of up to 75° to the axis. The long sides of the slots present shearing edges to the combination in the annular pressure chamber for effectively peeling away the meat from the bone resulting in a coarse texture of the meat recovered.

A double-bladed, fixedly mounted knife may be provided in the annular pressure chamber, parallel to the axis of the separation chambers. The knife is spring biased for resiliently bearing against the inner and outer surfaces of the respective outer and inner separation chambers for removing connective tissues such as sinew and fat from the slotted separation chamber walls to thereby avoid clogging and to assist in the process of separation.

The back pressure control valve according to the invention provides a restriction and maintains a constant pressure on the bone and meat in the annular pressure chamber while minimizing bone destruction, thus reducing the calcium content of the recovered meat. The valve is in the form of a pair of plates movable laterally toward and away from one another at the discharge end of the pressure chamber, each of the plates having beveled surfaces confronting the pressure chamber for translating the axial force applied in the pressure chamber to a lateral thrust for automatically opening the back pressure valve.

Other objects, advantages and novel features of the invention will become more apparent from the following detailed description of the invention when taken in conjunction with the accompanying drawings.

BRIEF DESCRIPTION OF THE DRAWINGS

FIG. 1 is a top-plan view, partly in section, of the meat recovery apparatus according to the invention;

FIG. 2 is a side elevational view, partly in section, of the FIG. 1 apparatus;

FIG. 3 is a view taken substantially along the line 3—3 of FIG. 2 showing, at an enlarged scale, details of one embodiment of the back pressure valve according to the invention;

FIG. 4 is a view similar to FIG. 3 of another embodiment of a back pressure valve according to the invention;

FIG. 5 is a sectional view, at an enlarged scale, taken substantially along the line 5—5 of FIG. 1;

FIG. 6 is a perspective view, at an enlarged scale, of the double-bladed knife according to the invention;

FIG. 7 is a view, at an enlarged scale, taken substantially along the line 7—7 of FIG. 1;

FIG. 8 is an expanded view, at an enlarged scale, of the inner and outer slotted separation chambers according to the invention; and FIG. 9 is a side view, at a still further enlarged scale, of a potion of the inner and outer separation chambers with the outer surrounding the inner.

DETAILED DESCRIPTION OF THE INVENTION

Turning now to the drawings wherein like reference characters refer to like and corresponding parts throughout the several views, a meat recovery apparatus according to the invention is generally designated 10 in FIGS. 1 and 2 mounted on a suitable support 11.

The apparatus comprises a press having a pressure piston 12 operating in cylinder 13 having a top opening in communication with a hopper 14 for loading the cylinder with a combination of meat and bones to be separated upon retraction of piston 12. Hydraulic pressing means 15 is coupled to piston 12 for extending and retracting the piston in any normal manner. The various components of the press are conveniently supported by a plurality of horizontally extending support rods 16 carried by vertical supports 17 which may be in the form of support plates.

According to the invention an annular pressure chamber 18 is provided coaxial with cylinder 13 at its downstream end to facilitate the meat recovery process of the invention as will be described in more detail hereinafter.

The annular pressure chamber is defined by a perforated inner separation chamber in the form of an elongated cylinder 19, and a surrounding perforated outer separation chamber 21. The inner and outer chambers are coaxial, with the outer chamber surrounding the inner chamber in spaced relation to form annular pressure chamber 18.

The inner separation chamber is supported at its upstream end by a conical flow divider 22 having a plurality of spaced apart wings 23 (such as three) for fixedly mounting the flow divider, as by spot welding or the like, to the inner wall of cylinder 13. The downstream end of cylinder 19 extends through a central opening in plates 23, 24 and is roller bearing supported by these plates. Cylinder 19 is likewise roller bearing supported at its upstream end to flow divider 22 for rotation in a given direction about the central axis of the cylinder. A rotary drive 25 mounted on a rod 16 has its output spindle 26 gear coupled to a gear ring 27 fixed about the cylinder to facilitate rotation of the inner separation chamber.

The outer separation chamber 21 has one or more gear rings 28 thereon coupled to the output spindle of a rotary drive 29 mounted on a rod 16 for rotating the outer separation chamber about its central axis in a direction opposite that of cylinder 19.

A back pressure control valve, generally designated 31, seals the downstream end of the annular pressure chamber. One embodiment of the back pressure control valve is shown in FIG. 3 as comprising a pair of opposing vertical support plates 32 mounted on rods 16 at the lateral sides of a pair of valve plates 33, 34 capable of transversely sliding apart in the direction of the arrows shown in FIG. 3. The confronting edges of the valve plates are arcuately shaped for embracing cylinder 19 in a closed, sealed position of the valve shown in solid outline in FIG. 3. And, each arcuate edge is tapered as at 35 forming an angle of about 30° to 60° relative to the downstream face of each valve plate.

Laterally extending piston and cylinder units 36 are mounted on supports 32 with their piston rods coupled to one end of crank arms 37, with the other end of each crank arm being pivotally connected to lateral arms 38 affixed to the valve plates. Thus, retraction of the piston rods into units 36 (operable from a source not shown), slide arms 38 and the connected valve plates apart to regulate the pressure in the annular pressure chamber, as will be described in more detail hereinafter.

As shown in FIG. 7, outer separation chamber 21 is roller mounted on the apparatus at opposite ends by a plurality of evenly spaced rollers 39 in engagement with the outer surface of chamber 21. And, one or more double edged knife blade units are mounted within the annular pressure chamber parallel to the central axis of the chamber. Such a unit is shown in detail in FIG. 6 as comprising an elongated rod 41 which, as shown in FIGS. 1 and 5, is mounted at opposite ends for movement about the central axis thereof, in some suitable manner. For example, rod 41 may have a coaxial pintle 42 (FIG. 6) extending from its upstream end which extends into a suitable opening in the confronting face of flow divider 22, as shown in FIG. 1. At the downstream end rod 41 extends through an opening 43 provided in a support plate 44, as shown in FIGS. 1 and 5. Each rod may have a transversely extending leg 45 extending into a cutout 46 of plate 44, a pair of opposing cushioning springs 47 extending between opposing sides of leg 45 and confronting edges of cutout 46, as clearly shown in FIG. 5, Each rod is thereby capable of oscillating in the direction of the double arrows shown in FIG. 5 upon counter-rotation of the inner and outer separation chambers.

As shown in FIGS. 1 and 2 plates 48 and 49 in addition to plates 23, 24 are stacked behind the back pressure control valve, each of the plates being mounted on rods 16 with cylinder 19 extending through central openings thereof. Plate 48 has an oversized central opening 53 relative to cylinder 19, plate 49 has an outwardly diverging annular conical opening 54 in communication with opening 53, and plates 23 and 24 have annular openings 55 in communication with opening 54. Openings 53, 54 and 55 in these plates together define a discharge flow passage for the bone pack remaining after the meat is recovered from the bone during the process carried out according to the invention.

Referring to FIGS. 8 and 9, it will be seen that the perforations provided in the cylindrical walls of the inner and outer separation chambers are, according to the invention, in the form of elongated slots. Inner separation chamber 19, in the form of an elongated cylinder of unitary construction having a constant cross-section, has a plurality of elongated slots 56 arranged in circumferential rows 57 mutually spaced apart a predetermined distance along the axis of the cylinder. The rows of slots are located in a section of cylinder 19 in the vicinity of annular pressure chamber 18.

Slots 56 in each of their rows are parallel to each other and are oriented in the same direction at an angle of up to about 75° relative to the cylinder axis. The slots could otherwise lie parallel to the axis of cylinder 19, i.e., 0° (not shown), without departing from the invention. And, the slots slope downwardly from horizontal in a direction 58 of rotation of the inner separation chamber, shown by the arrow in FIG. 9.

Similarly, elongated slots 59 are provided in the cylindrical wall of outer separation chamber 21 which is in the form of a cylinder of unitary construction of constant cross-section. Slots 59 are arranged in circumferential rows 61 mutually spaced apart along the axis of the cylinder, the rows of slots being located in the vicinity of annular pressure chamber 18. Slots 59 in each of their rows are parallel to one another and are oriented in the same direction and lie at an angle of up to about 75° to the central axis of cylinder 21. Slots 59 could lie parallel to the central axis of cylinder 21, i.e., at 0° (not shown), without departing from the invention.

Slots 59 slope downwardly from horizontal in a direction 61 of rotation of the outer separation chamber, shown by arrow 61 in FIG. 9.

Slots 56 together present a combined open area for cylinder 19 which is substantially equal to the combined open area presented by slots 59 of cylinder 21.

Each of the elongated slots 56 and 59 has a length-to-width ratio of about 1:0.02 to 1:0.04 inches. And, the long sides of the slots of both the inner and outer cylinders present shearing edges to the combination of meat and bones confronting the long sides upon operation of the press for shearing the meat from the bones to improve upon the texture of the recovered meats.

Opposing ends 62 of slots 56 are radiussed to provide additional shearing edges to the meat and bones combination. Similarly, and for the same purpose, opposing ends 63 of slots 59 are similarly radiussed.

Although cylinders 19 and 21 are described as being of unitary construction, it should be pointed out that each of these cylinders can likewise be constructed of a single plate forming a cylinder with the opposing plate edges seam welded together to form a unitary construction. Cylinders 19 and 21 can be otherwise structured so long as the cylinders do not comprise a series of stacked rings forming a cylinder.

Each of the double-bladed rods 41 have a pair of opposing knife blades 64 (FIGS. 1 and 6) which respectively bear against the outer surface of cylinder 19 and the inner surface of cylinder 21. The knife blades may be sharpened or blunted along their edges contacting the cylinders, and pressure of about 1500 to 3000 psi are maintained on the knife edges by the spring loading of rods 41 presented by springs 47.

In operation, a combination of meat and bones to be separated is loaded into cylinder 13 from hopper 14 with pressure piston 12 retracted. Pressure piston 12 is activated by hydraulic pressing means 15. During the pressure stroke, which stops before reaching flow divider 22, the meat and bone material is forced into annular pressure chamber 18 as directed by the stationary flow divider.

At some convenient juncture before or during operation of the press, inner separation chamber 19 is rotated in the direction of arrow 58 (FIG. 9), and outer separation chamber 21 is rotated in the opposite direction, shown by arrow 61. The slotted separation chambers are rotated in such opposite directions at approximately the same rpm.

Valve plates 33, 34 of the back pressure control valve are closed together about cylinder 19 for providing the necessary back pressure to the meat and bones combination pressurized in forced into annular pressure chamber 18 by pressure piston 12 creating a pressure in the chamber of about 1800 to 2000 psi sufficient to recover the meat from the bone as the meat passes outwardly through slots 59 of outer separation chamber 21 and at the same time passes inwardly through slots 56 of inner separation chamber 19 during counter-rotation of the slotted separation chambers. However, the pressure in chamber 18 is sufficiently low to minimize cell destruction during the meat recovery process. Recovered meat of coarse texture results permitting more flexibility in the use of the recovered meat by reduced loss in protein until the material is used in other products.

The pressure to which the meat and bones combination is subjected in pressure chamber 18 is at a reduced level relative to prior art presses by increasing the combined open area presented by inner slots 56 and outer slots 59 through which the separated meat can flow. Pressure reduction is also achieved by reducing the volume of the product being compressed, i.e., by the provision of an annular pressure chamber.

Such pressure reduction is effected by the provision of a slotted separation chamber both internal to the product flow and external to the product flow as aforedescribed. Improved product texture is achieved by use of the slot arrangement of the inner and outer separation chambers according to the invention, instead of holes.

During counter-rotation of the slotted separation chambers about their common axis, the long sides of slots 56 and 59 present a multiplicity of shearing edges for essentially peeling away the meat from the bones as flat bones (neck, back, rib, etc.) of meat products such as beef, pork and mutton are oriented with their long sides confronting the inner and outer slots 56 and 59. The separated meat passing through slots 56 of the inner separation chamber collect within hollow cylinder 19 and, as the cylinder rotates, the meat moves toward and through the open end of cylinder 19 and into a collection container 65 via a chute 66.

The recovered meat passing through slots 59 outwardly of cylinder 21 fall by gravity upon rotation of the cylinder into a chute 67 for collection in a suitable container (not shown).

Knife edges 64 may be made from a sacrificial metal which can be replaced as necessary. The counter-rotating action of the inner and outer separation chambers does not destroy the integrity of the bone in the product. Spring loading of the knife edges maintains the cutting pressure applied against the outer surface of cylinder 19 and against the inner surface cylinder 21 as required to remove connective tissues such as sinew and fat from both separation chamber walls and allows for any irregularities in the surfaces of cylinders 19 and 21.

The knife edges are maintained in place by holder rod 41 while the chambers are rotated. The outer separation chamber is supported by heavy duty cam rollers 39 at opposite ends, and the inner separation chamber is supported by heavy duty bearings 68, 69 at opposite ends. The slotted separation chambers are counter rotated or indexed by rotary drives 25 and 29 via spindle and ratchet assemblies. Pressures of 1500 to 3000 psi are maintained on the edges of knife blade 64 by means of spring loading provided by opposing springs 47.

The knife blades remove the connective tissues from the slots of both cylinders 19 and 21 before such tissues or any bone particles pass through the slots by cleanly cutting and/or wiping away the tissues.

The lower pressure required in the annular pressure chamber in carrying out the separation process according to the invention avoids pulverization or grinding of the bones in the annular pressure chamber. The calcium content in the recovered meat is low (0.5° or less) given that the bones are not totally destroyed during the separation process, and coarse texture results in the meat recovered (0.06 inches thick or greater).

During the pressing operation, valve plates 33, 34 separate by moving away from cylinder 19 (shown in phantom outline in FIG. 3) to open the discharge end of the annular pressure chamber. Beveled surfaces 35 provided along at least the arcuate edges of plates 33 and 34 confront the annular pressure chamber. By such arrangement the beveled inner surfaces of the valve plates translate the axial force applied to the meat and bones combination to laterally outward forces for automatically separating the valve plates to open the discharge permitting the bone pack collected in chamber 18 to be discharged outwardly of the press through the discharge passage formed by openings 53, 54 and 55, and into a suitable container 71, such as via a chute 72.

It should be pointed out that, unlike prior art presses for separating meat from bones, the aforedescribed separation process and the automatic opening of the valve plates take place during a single plunging operation of the pressure piston 12 without having to relax the pressure applied by the piston to permit opening of the back pressure valve.

The back pressure control valve functions as a flow restrictor which is capable of being set as a feedback pressure system. The setting is effected by retraction of the piston of the piston/cylinder units 36 (FIG. 3) for spreading arms 38 apart to thereby separate valve plates 33 and 34 depending on the back pressure required for a given pressing operation. Also, extension of the pistons of units 36 function to close valve plates 33 and 34 together when necessary as between pressing operations.

The back pressure control valve provides a more uniform pressure control on the product in the annular pressure chamber and effects reduction of bone damage to the product, thus reducing the calcium content of the recovered meat. Regulation of the restriction or back pressure of the valve is also possible to automate. Product yield can therefore be set and maintained by mechanical or electronic feedback.

The valve plates, or restrictor elements 33, 34, are beveled to translate axial pressure into outward thrust. The valve plates are mechanically linked and controlled by hydraulic pressure applied by the cylinders 36. This pressure may be regulated by means of a differential pressure valve and pressure feedback to a programmable logic controller (not shown).

Another embodiment of a back pressure control valve is shown in FIG. 4 which operates essentially the same as that described with reference to FIG. 3, except that piston and cylinder units 73, mounted on support plates 32, are respectively connected to arms 38. Thus, upon extension of the pistons from these units, the arms 38 connected to the valve plates effect valve plate separation (as shown in phantom outline).

From the foregoing it can be seen that a simple and economical yet highly efficient press has been provided for separating meat from bones yielding both an improved texture of recovered meat promoting usage as a primary meat source for finished goods production, and which reduces the calcium content of the meat in that the bones are not pulverized or ground in the annular pressure chamber. The meat is not recovered as a paste or a slurry as prior art presses, and an automatic back pressure control valve simplifies the procedure while functioning as a flow restrictor for controlling the pressure in the pressure chamber.

The counter-rotating slotted separation chambers define between them an annular pressure chamber which reduces the volume of product being compressed. The pressure reduction is also effected by increasing the open area through which the meat can flow, as by the provision of inner and outer slotted separation chambers.

The double-bladed knife or knives simultaneously cut and clean the surfaces of both slots at the separation chambers to reduce clogging and to avoid connective tissue from passing through the elongated slots. The bone package is discharged through an automatic and/or controlled restriction of the back pressure control valve plates during a single forward movement of the plunger without relaxing the pressure in the pressure chamber applied by the plunger.

The elongated slots present a multiplicity of shearing edges to strip the meat from the bones, both internally and externally to the product flow, for assuring a high rate of meat recovery and an improved meat texture with reduced calcium content.

It should be pointed out that although the slotted separation chambers have been described as counter rotating in carrying the invention, one or both slotted separation chambers could be made stationary without departing from the invention.

And, the invention is readily adopted for separating poultry from bone and fish from bone, and for separating other comestible fleshy products from pits or seeds, within the scope hereof.

Obviously, many other modifications and variations of the present invention are made possible in the light of the above-teachings. It is therefore to be understood that within the scope of the appended claims the invention may be practice otherwise than as specifically described.

What is claimed is:

1. A method for separating meat from bones by utilizing a press having an inner cylindrical perforated separation chamber surrounded by an outer cylindrical perforated separation chamber coaxially disposed and defining with said inner chamber an annular pressure chamber, the inner and outer chambers being rotatable about a common axis and each having openings extending through the walls thereof, and means for closing a discharge end of said pressure chamber, the method comprising:

introducing a combination of meat and bones to be separated into said annular pressure chamber through an inlet end thereof;

rotating said inner and outer separation chambers in opposite directions; and applying pressure to the combination of meat and bones in the annular pressure chamber for separating the combination by forcing the meat through the openings inwardly of the inner chamber and outwardly of the outer chamber.

2. The method according to claim 1, wherein the press includes a pressure piston for carrying out the pressure applying step.

3. The method according to claim 1, wherein the closing means comprises a back pressure control valve capable of opening said discharge end, the method further comprising:

discharging the bones from said annular pressure chamber, during the pressure applying step, outwardly of the press via said back pressure control valve which opens in response to the applied pressure.

4. The method according to claim 1, wherein the openings in the walls of said separation chambers comprise elongated slots.

5. The method according to claim 4, wherein said elongated slots of said inner separation chamber are slanted in one direction of rotation of said inner chamber, and said elongated slots in said outer separation chamber are slanted in a direction of rotation of said outer chamber opposite said one direction.

6. The method according to claim 1, wherein the press further includes blade means located in said annular chamber, the method further comprising:

removing any connective tissue from the openings of said inner and outer chambers during the rotating step as the blade means cuts the tissue while the separated meat is forced through the openings.

7. An apparatus for separating meat from bones in the form of a press, comprising:

an elongated inner perforated separation chamber;

an elongated outer perforated separation chamber surrounding said inner chamber in spaced relation to therewith define an annular pressure chamber;

said inner and outer chambers having a common axis and being mounted on said press for rotation in opposite directions respectively about said axis;

means for closing a discharge end of said pressure chamber;

piston means for pressing a combination of meat and bones to be separated in said annular pressure chamber;

means for rotating said separation chambers in said opposite directions;

said piston means applying pressure to the combination of meat and bones during the rotation of said separation chambers for separating the combination by forcing the meat through the inner chamber perforations inwardly of the inner chamber and through the outer chamber perforations outwardly of the outer chamber.

8. The apparatus according to claim 7, wherein said closing means comprises a shutter valve mounted on the press for lateral movement to open said discharge end for releasing bones from said annular pressure chamber upon separation.

9. The apparatus according to claim 8, wherein said shutter valve comprises a pair of plates embracing said inner separation chamber.

10. The apparatus according to claim 9, wherein said plates have beveled inner surfaces confronting said annular pressure chamber for translating an axial force applied to the combination to laterally outward forces for automatically separating the plates in response to the applied axial force for opening the discharge end.

11. The apparatus according to claim 9, further including means for effecting the lateral movement of said plates to open the discharge end.

12. The apparatus according to claim 7, further comprising blade means extending parallel to said axes within said annular pressure chamber for removing any connective tissue from the perforations of the inner and outer chambers during rotation thereof as the blade means cuts the tissue while the separated meat is forced through the perforations.

13. The apparatus according to claim 12, wherein said blade means comprise a pair of cutter blades extending radially from a shaft mounted to said press.

14. The apparatus according to claim 13, wherein one of said blades bears against the inner surface of said outer chamber, and the other of said blades bears against the outer surface of said inner chamber, said shaft being pivotally mounted in place and having resilient means for cushioning pivotal movement thereof.

15. The apparatus according to claim 7, wherein the perforations of said separation chambers comprise elongated slots.

16. The apparatus according to claim 15, wherein said inner chamber rotates in one direction with said elongated slots thereof being sloped in said one direction, said outer chamber rotating in an opposite direction with said elongated slots thereof sloping in said opposite direction.

17. A separation chamber for use in separating meat from bones in a press, comprising, an elongated cylinder of unitary construction, said tube comprising a straight cylinder of uniform diameter between opposing ends, said tube having a plurality of through openings arranged in circumferential rows mutually spaced apart along the axis of tube and located in a predetermined section of said tube between said opposing ends, said openings comprising elongated slots each oriented in the same direction about 0° to 75° relative to said tube axis, and each said elongated slots having a length: width ratio of about 1:0.02 to 1:0.04 inches, whereby the performance of the separation chamber is enhanced as long sides of said slots present shearing edges to a combination of meat and bones confronting said long sides upon operation of the press for shearing the meat from the bones.

18. The separation chamber according to claim 17, wherein each of said slots is oriented at an angle of 30° relative to said tube axis.

19. The separation chamber according to claim 17, wherein said slots in each of said rows are parallel to one another.

20. The separation chamber according to claim 17, wherein opposite ends of said slots are radiussed to provide additional shearing edges to the combination of meat and bones.

21. In a press for separating meat from bones including, in combination, a pressure chamber for containing a combination of meat and bones to be separated, seal valve means at a discharge end of said chamber, said chamber including a cylindrical perforated separation chamber adjacent said closing means, and piston means for applying an axial force to the combination to separate the meat from the bones by pressing the meat through perforations of the separation chamber, the improvement wherein:

said seal valve means comprises a shutter valve including a pair of plates closed together for closing the discharge end, the pair of plates being laterally separable for opening the discharge end to allow passage of compressed bones therefrom, said plates having beveled inner surfaces confronting said separation chamber for translating the axial force applied to the combination to laterally outward forces for automatically separating said plates in response to the applied axial force for opening the discharge end.

22. In the press according to claim 21, wherein the beveled inner surfaces extend to confronting inner edges of said plates.

23. In the press according to claim 21, wherein means are provided on the press for effecting lateral movement of the plates for controlling the pressure in said chamber.

24. In the press according to claim 22, wherein said beveled inner surfaces form 45° angles with the respective outer surfaces of said plates.

* * * * *